United States Patent [19]

Ijuin

[11] Patent Number: 5,222,723
[45] Date of Patent: Jun. 29, 1993

[54] SHEET SUPPLYING APPARATUS WITH AN INTERMITTENTLY DRIVEN SHEET SEPARATOR AND CONTINOUSLY DRIVEN SHEET CONVEYOR

[75] Inventor: Kazuya Ijuin, Tokyo, Japan

[73] Assignee: Canon Kabushiki Kaisha, Tokyo, Japan

[21] Appl. No.: 753,839

[22] Filed: Jul. 22, 1991

[30] Foreign Application Priority Data

Jul. 24, 1990 [JP] Japan .................. 2-195279
May 29, 1991 [JP] Japan .................. 3-154081

[51] Int. Cl.⁵ .............................. B65H 3/06
[52] U.S. Cl. ........................ 271/10; 271/114
[58] Field of Search ............ 271/10, 114, 116, 256, 271/266

[56] References Cited

U.S. PATENT DOCUMENTS

| 3,184,231 | 5/1965 | Varrichio | 271/36 |
| 3,908,982 | 9/1975 | Abe | 271/114 |
| 4,600,929 | 7/1986 | Cardona et al. | 271/114 |
| 4,607,832 | 8/1986 | Abe | 271/10 |
| 4,653,742 | 3/1987 | Sasaki et al. | 271/114 |
| 4,927,130 | 5/1990 | Tanaka et al. | 271/114 |

FOREIGN PATENT DOCUMENTS

| 65306 | 9/1982 | European Pat. Off. | 271/10 |
| 0263319 | 4/1988 | European Pat. Off. | |
| 58-039164 | 3/1983 | Japan | |
| 62-244828 | 10/1987 | Japan | |
| 2-152846 | 6/1990 | Japan | |

Primary Examiner—Robert P. Olszewski
Assistant Examiner—Steven M. Reiss
Attorney, Agent, or Firm—Fitzpatrick, Cella, Harper & Scinto

[57] ABSTRACT

An automatic sheet supplying apparatus comprising a first supply rotary member for feeding a sheet intermittently, and a second supply rotary member disposed at a downstream side of the first supply rotary member in a sheet feeding direction and adapted to feed the sheet at a stop time period shorter than that of the first supply rotary member. A clearance is created between a previously fed sheet and a next sheet.

18 Claims, 6 Drawing Sheets

SHEET SUPPLYING APPARATUS WITH AN INTERMITTENTLY DRIVEN SHEET SEPARATOR AND CONTINUOUSLY DRIVEN SHEET CONVEYOR

BACKGROUND OF THE INVENTION

1. Field of the Invention

The present invention relates to an automatic sheet supplying apparatus which is incorporated into a recording system or an image reading system such as a facsimile, laser beam printer, image reader the like.

2. Related Background Art

As one of automatic sheet supplying apparatuses incorporated into an image reading system such as a facsimile, a sheet supplying apparatus comprising a sheet separating means including a separation roller and a friction member urged against the separation roller with a predetermined pressure, and a sheet supply means including a sheet supply roller and a driven roller urged against the sheet supply roller with a predetermined pressure has been known.

FIGS. 6 and 7 show an example of a conventional automatic sheet supplying apparatus of the above-mentioned type.

In FIGS. 6 and 7, the reference numeral 1 denotes an original support on which original sheets 2 are stacked; 3 denotes a sheet separating means disposed at a downstream side of the original support 1; 5 denotes a sheet supply means disposed at a downstream side of the sheet separating means 3; 6 denotes a sheet ejecting means disposed at a downstream side of the sheet supply means 5; and 7 denotes an image sensor of contact type disposed below an upper original guide plate 9 between the sheet supply means 5 and the sheet ejecting means 6.

An original presence/absence detection sensor 10 for detecting the presence or absence of the original sheet 2 stacked on the original support 1 is provided in connection with the original support 1. The sheet separating means 3 is constituted by a separation roller 11 and a friction plate (friction member) 12 urged against the separation roller 11 with a predetermined pressure. The friction plate 12 is biased by a separating and urging spring (coil spring) 13 toward the separation roller. The sheet supply means 5 is constituted by a sheet supply roller 15 and a driven roller 16 urged against the sheet supply roller 15 with a predetermined pressure. The driven roller 16 is biased by a plurality of leaf springs 17, 19 toward the sheet supply roller. The sheet ejecting means 6 is constituted by an ejector roller 20 and a driven roller 21 urged against the ejector roller 20 with a predetermined pressure. The driven roller 21 is biased by a plurality of leaf springs 17, 19 toward the ejector roller. The ejector roller 20 and the driven roller 21 of the sheet ejecting means 6 are made of material same as those of the sheet supply roller 15 and the driven roller 16 of the sheet supply means 5, respectively.

The leaf springs 17, 19 extend between and are rested on shafts 22, 23 of the driven rollers 16, 21 so that they apply the same pressure to the roller shafts 22, 23 by a weight 24 disposed at central portions of the leaf springs.

A rotational force from a motor (not shown) is transmitted to the separation roller 11 of the sheet separating means 3, the sheet supply roller 15 of the sheet supply means 5 and the ejector roller 20 of the sheet ejecting means 6. In this case, the rotational force of the motor is firstly transmitted to the sheet supply roller 15, and the rotational force transmitted to the sheet supply roller 15 is transmitted to the separation roller 11 and the ejector roller 20.

More particularly, as shown in FIG. 7, a gear 26 for transmitting the rotational force of the motor is attached to one end of a roller shaft 25 of the sheet supply roller 15. A gear 30 connected to the gear 26 through an intermediate gear 29 is attached to one end of a roller shaft 27 of the separation roller 11. Further, pulleys 32, 33 having the same diameters are attached to one end of the roller shaft 25 of the sheet supply roller 15 and one end of a roller shaft 31 of the ejector roller 20, these pulleys being interconnected by an endless belt 35. Thus, when the motor is rotated, the rotational force of the motor is transmitted to the sheet supply roller 15 via the gear 26. Further, the rotational force transmitted to the sheet supply roller 15 is transmitted to the separation roller 11 via the gear 26, intermediate gear 29 and gear 30, and, at the same time, is transmitted to the ejector roller 20 via the belt 35. Incidentally, the motor is drivingly rotated when the original presence/absence sensor 10 detects the original sheet 2 stacked on the original support 1.

With the arrangement as mentioned above, when the original sheets 2 are rested (stacked) on the original support 1 as shown in FIG. 6, by detecting the original sheet by means of the original presence/absence sensor 10, the motor (not shown) is rotated, thus rotating the separation roller 11, sheet supply roller 15 and ejector roller 20 in directions shown by the arrows simultaneously. In this way, as shown, the original sheets 2 rested on the original support 1 with being abutted against the separation roller 11 and the friction plate 12 are separated in such a manner that only a lowermost original sheet is separated by the separation roller 11 and is fed toward a downstream side of the sheet separating means 3.

In the sheet separating means 3, since the relation between a friction force $\mu_1$ (between the separation roller 11 and the original sheet 2) and a friction force $\mu_2$ (between the friction plate 12 and the original sheet 2) and a friction force $\mu_3$ (between the original sheets 2) is so selected as to be $\mu_1 > \mu_2 > \mu_3$, a plurality of originals 2 can be separated in a nip between the separation roller 11 and the friction plate 12 so that only the lowermost original sheet is separated by the separation roller 11 and is fed.

When a leading end of the original sheet 2 fed by the separation roller 11 is pinched by a nip 37 between the sheet supply roller 15 and the driven roller 16, the original sheet is conveyed by the sheet supply roller 15 toward a downstream side of the sheet supply means 5. Now, when the leading end of the original sheet 2 has passed through the nip 37, the leading end of the original sheet 2 is detected by an original end detection sensor 39, with the result that the original sheet 2 is fed by a predetermined amount. Thereafter, image information on the original sheet 2 is read by the image sensor 7 while the original sheet is being fed by the sheet supply roller 15. When the leading end of the original sheet is pinched by a nip 40 between the ejector roller 20 and the driven roller 21, the original sheet is conveyed without any slack by means of the ejector roller 20 and the sheet supply roller 15 which are rotated at the same speed. When a trailing end of the original sheet 2 has passed through the nip 37 between the sheet supply roller 15 and the driven roller 16 and is detected by the original end detection sensor 39, the original sheet is conveyed by the ejector roller 20 by a predetermined amount.

By the way, the above-mentioned conventional automatic sheet supplying apparatus is so designed that, immediately after the trailing end of the firstly fed original sheet 2 has passed through the nip 36 between the separation roller 11 and the friction plate 12, a next original sheet 2 rested on the original support 1 is supplied with following the firstly fed original sheet 2. In this case, if there is no gap (clearance) between the trailing end of the firstly fed original sheet 2 and the leading end of the next original sheet 2, the original end detection sensor 39 cannot correctly detect the trailing end of the firstly fed original sheet 2 and the leading end of the next original sheet 2, with the result that the image information cannot be correctly read by the image sensor 7 and/or the original sheet cannot be correctly ejected.

For these reasons, the conventional automatic sheet supplying apparatus is so designed that there is a difference in sheet feeding speed between the previous original sheet 2 and the next original sheet 2 by setting a peripheral speed of the sheet supply roller 15 to be faster than that of the separation roller 11. In this way, since the previous original sheet is conveyed by the faster sheet supply roller 15 and the next original sheet 2 is conveyed by the slower separation roller 11, a gap is created between the trailing end of the previous original sheet 2 and the leading end of the next original sheet 2.

However, in the conventional case where the peripheral speed of the sheet supply roller 15 is set to be faster than that of the separation roller 11 to create the gap between the trailing end of the previous original sheet 2 and the leading end of the next original sheet 2, the following problem arises.

That is to say, when the leading end of the supplied original sheet 2 is pinched by the nip 37 between the sheet supply roller 15 and the driven roller 16 and, thus, the sheet supply roller 15 starts to convey the original sheet 2, there arises a difference in speed between the separation roller 11 rotated at a speed slower than that of the sheet supply roller 15 and the original sheet 2 contacted by the separation roller 11 and conveyed by the sheet supply roller, with the result that a sheet portion contacted by the separation roller 11 is pulled by the faster sheet supply roller 15. Consequently, the separation roller 11 applies a load to the original sheet 2 being fed (i.e., there is a slip between the separation roller 11 and the original sheet 2). Accordingly, the image information recorded by a pencil and the like on a surface of the original sheet 2 which is contacted by the separation roller 11 will be deteriorated due to the relative slipping movement between the separation roller 11 and the original sheet 2.

In order to solve such a problem, a one-way clutch 41 of needle type is provided on the gear 30 attached to the roller shaft 27 of the separation roller 11 so that, when the original sheet 2 is fed at a speed greater than the peripheral speed of the separation roller 11, the peripheral speed of the separation roller 11 becomes the same as the speed of the original sheet 2. However, the one-way clutch 41 of needle type is very expensive, and does not permit to reduce a pitch circle of the gear 30 due to the outer configuration of the clutch, and, accordingly, the roller shaft 27 is lengthened, thus limiting the applications of the apparatus. Further, when the one-way clutch is used, if outer diameters of the separation roller 11 and the sheet supply roller 15 are preselected, the numbers of teeth of the gears associated with the separation roller 11 and the sheet supply roller 15 must be altered in order to control the gap between the previous original sheet 2 and the next original sheet 2, which is very difficult in design.

In place of the one-way clutch of needle type, a spring clutch can be used. However, since the spring clutch has a disadvantage that it generates the noise and/or slip if an amount of grease applied to the clutch is not proper, the control of the spring clutch is very troublesome.

As mentioned above, in the conventional method for creating the gap between the trailing end of the previous original sheet 2 and the leading end of the next original sheet 2 by setting the peripheral speed of the sheet supply roller 15 to be greater than that of the separation roller 11, there arose the problem that the image information on the original sheet 2 was deteriorated due to the relative slip between the original sheet and the separation roller 11. Further, the one-way clutch for solving the above problem also arose other various problems.

SUMMARY OF THE INVENTION

The present invention aims to solve the above-mentioned conventional problems, and an object of the present invention is to provide an automatic sheet supplying apparatus which does not use any parts such as a one-way clutch that causes various problems in view of cost, design, application and control, and which does not deteriorate image information recorded on a sheet and can create a proper gap between a trailing end of a previous sheet and a leading end of a next sheet.

In order to achieve the above object, the present invention provides an automatic sheet supplying apparatus, which, referring to FIGS. 1 and 2, comprises a sheet separating means (3) constituted by a separation roller (11) and a friction member (12) urged against the separation roller (11) with a predetermined pressure, and a sheet supply means (5) constituted by a sheet supply roller (15) and a driven roller (16) urged against the sheet supply roller (15) with a predetermined pressure, whereby sheets (2) are separated one by one by means of the sheet separating means (3) and the separated sheet (2) is supplied by the sheet supply means (5).

According to the present invention, a rotational force is discontinuously or intermittently transmitted to the separation roller (11) of the sheet separating means (3) and is continuously transmitted to the sheet supply roller (15) of the sheet supply means (5). Further, the rotational force is transmitted to the separation roller (11) of the sheet separating means (3) via an intermittent gear (42) meshed with a gear (30) on a roller shaft (27). Further, the rotational force can be transmitted to the separation roller (11) of the sheet separating means (3) by abutting one of protruded portions (4b1, 4b2) of an intermittent cam (4) rotated in synchronous with a roller shaft (25) against the separation roller.

With the arrangement as mentioned above, when the previous sheet (2) is fed by the sheet supply roller (15) and the next sheet (2) is fed by the separation roller (11), since the rotational force is transmitted to the sheet supply roller (15) continuously and to the separation roller (11) intermittently, the previous sheet (2) is fed continuously and the next sheet (2) is fed intermittently.

When the sheet (2) is fed by both the sheet supply roller (15) and the separation roller (11), if the rotational force is being transmitted to the separation roller (11) the sheet (2) is fed by both the sheet supply roller (15) and the separation roller (11), whereas, if the rotational force is not transmitted to the separation roller (11) the sheet (2) is fed only by the sheet supply roller (15). In the latter case, since the sheet (2) is pulled by the sheet supply roller (15), the separation roller (11) will be rotated at a speed same as that of the sheet supply roller (15) due to the friction force between the sheet (2) and the separation roller.

Further, as mentioned above, the rotational force can be transmitted to the separation roller (11) intermittently. In this case, the rotational force is transmitted to the separation roller (11) when a toothed portion of the intermittent gear (42) is meshed with the gear (30) attached to the roller shaft (27) and is not transmitted to the separation roller when the toothed portion of the intermittent gear (42) is disengaged from the gear (30).

As mentioned above, since the automatic sheet supplying apparatus according to the present invention is so designed that the rotational force is transmitted to the separation roller of the sheet separating means intermittently and to the sheet supply roller of the sheet supply means continuously, it is possible to create a gap between the trailing end of the previous sheet and the leading end of the next sheet. Accordingly, it is possible to surely detect the trailing end of the previous sheet and the leading end of the next sheet. Incidentally, the sheet supply roller may also be rotated intermittently. However, in this case, a stop time period of the sheet supply roller should be shorter than that of the separation roller. Accordingly, an arrangement wherein the sheet supply roller is rotated with a fine intermittent movement by means of a stepping motor and the like is included in the scope of the present invention.

As mentioned above, when the sheet is fed by both the sheet supply roller and the separation roller, if the rotational force is not transmitted to the separation roller, the latter is rotated at the same peripheral speed as that of the sheet supply roller due to the friction force between the separation roller and the sheet being pulled by the sheet supply roller. Thus, the image information recorded by a pencil and the like on the sheet is not damaged or deteriorated by the relative slip between the sheet and the separation roller.

Further, since the means for intermittently transmitting the rotational force to the separation roller comprises the intermittent gear meshed with the gear attached to the roller shaft of the separation roller or intermittent cam driving the separation roller by intermittently abutting against the latter, there are no problems which were arisen by the one-way clutch, in view of cost, design, application and control.

DESCRIPTION OF THE PREFERRED EMBODIMENTS

The present invention will now be explained with reference to the accompanying drawings.

Figure 1:
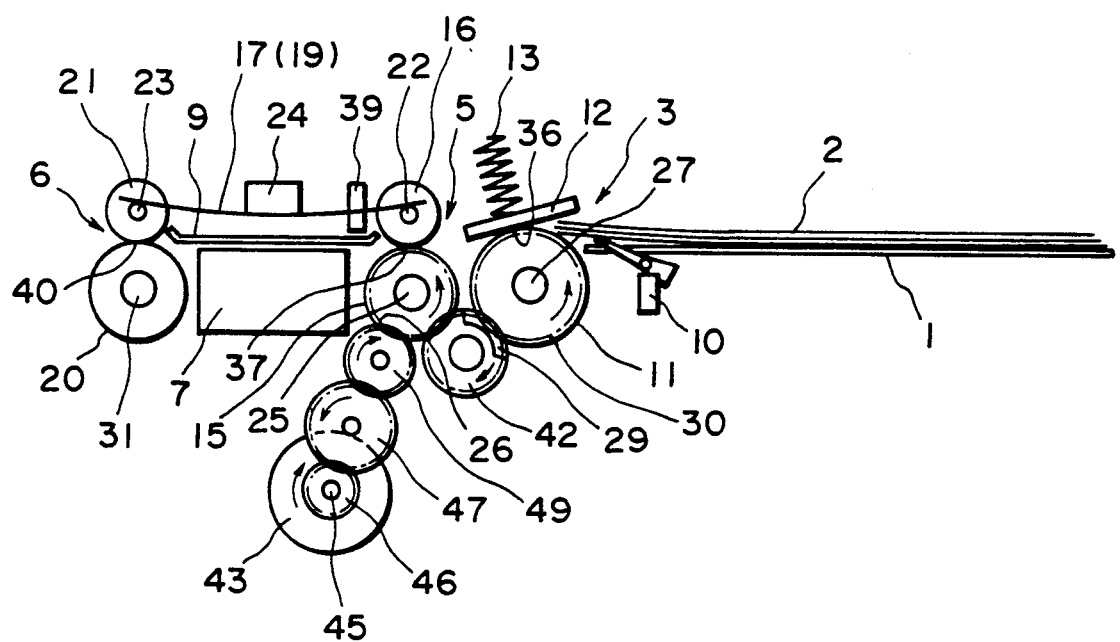
FIG. 1 is an elevational sectional view of an automatic sheet supplying apparatus according to a preferred embodiment of the present invention.
Figure 2:
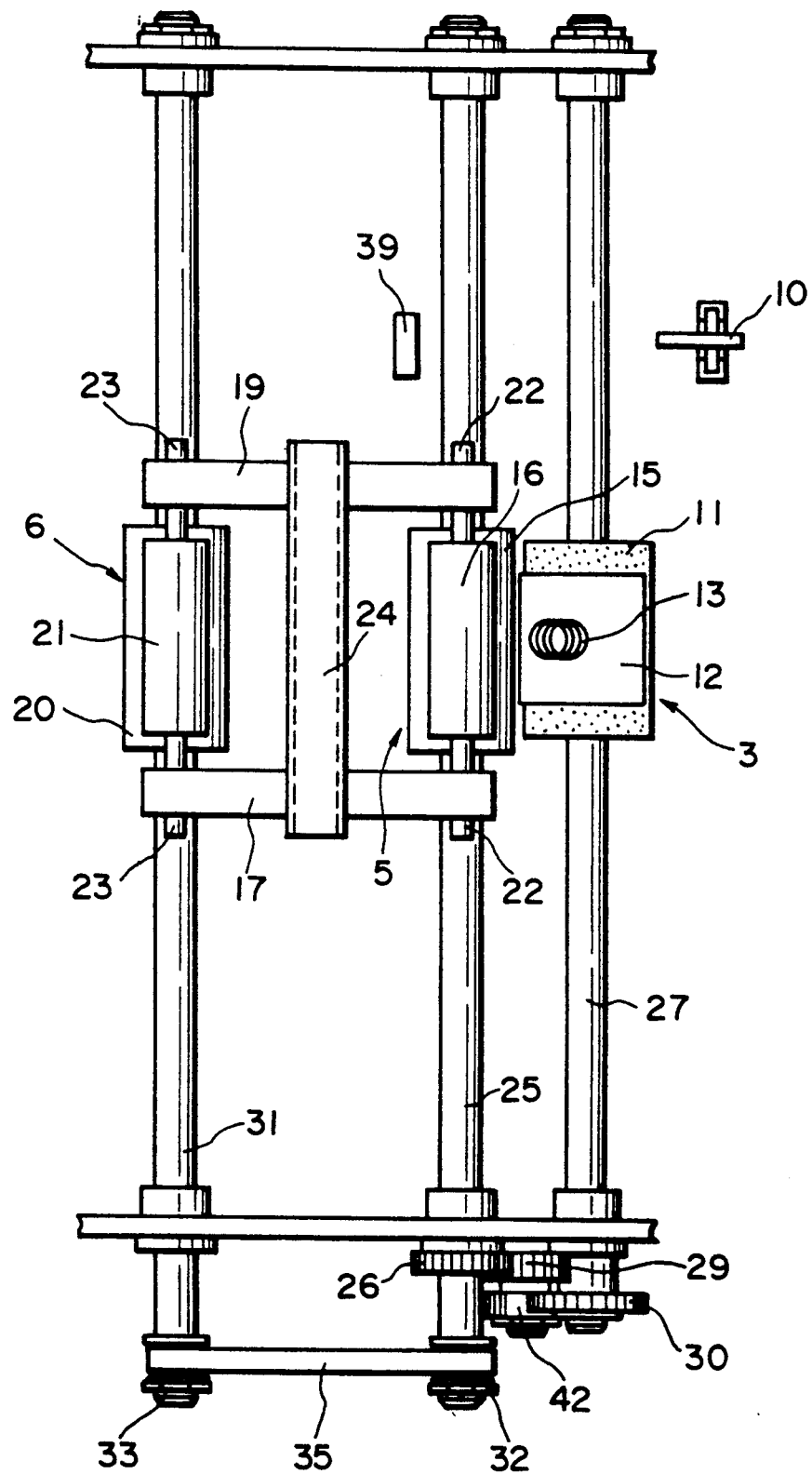
FIG. 2 is a plan view of the automatic sheet supplying apparatus of FIG. 1.
Figure 6:
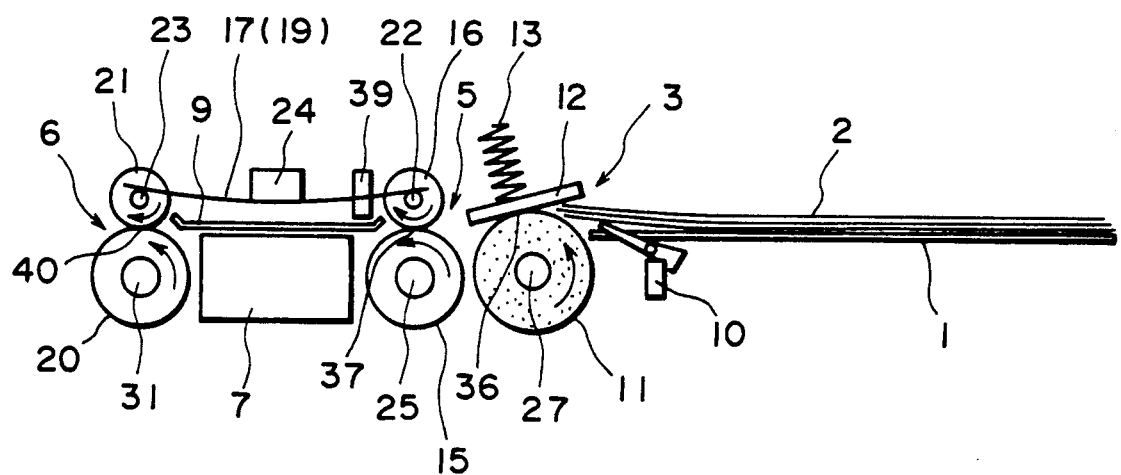
FIG. 6 is an elevational sectional view of a conventional automatic sheet supplying apparatus.
Figure 7:
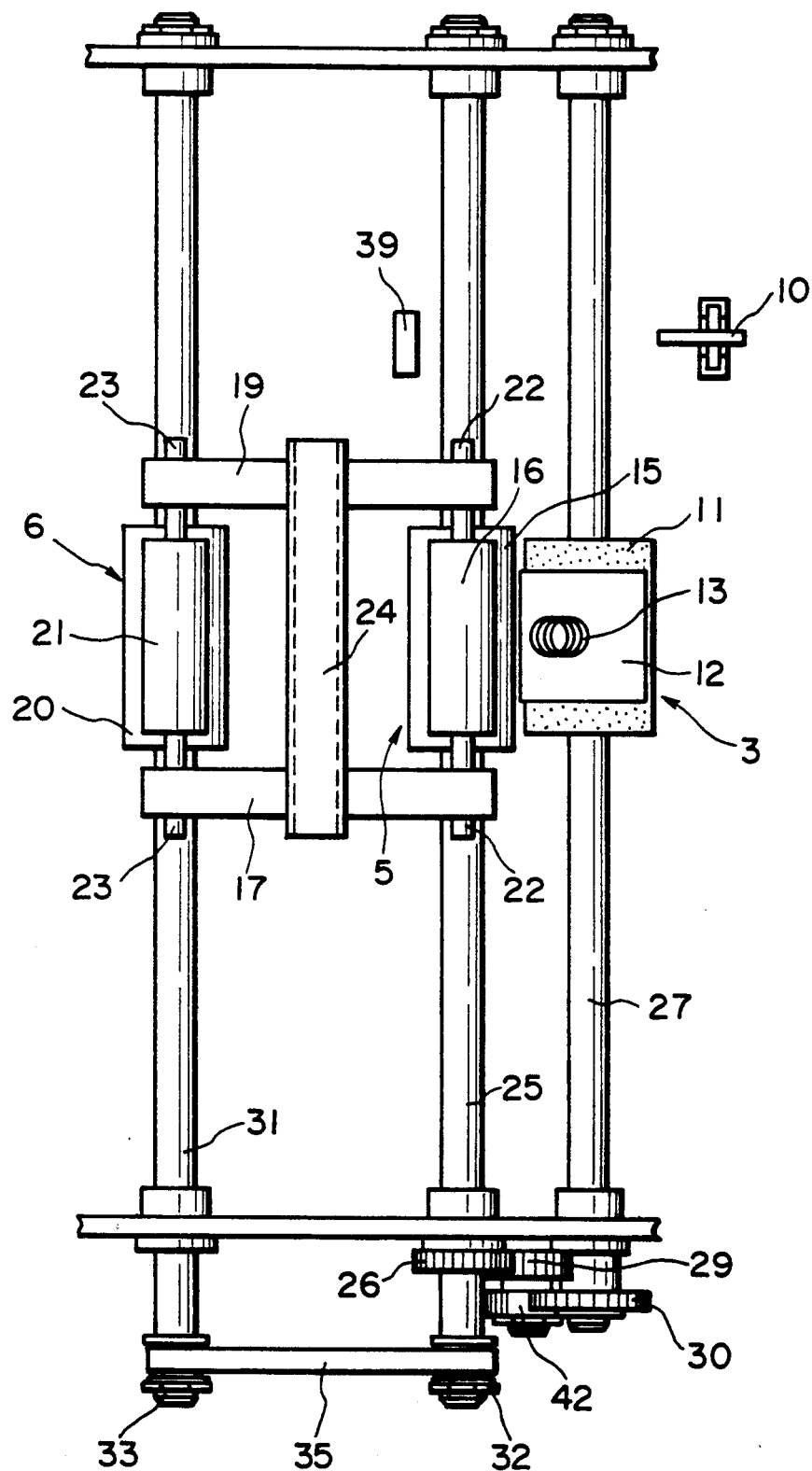
FIG. 7 is a plan view of the automatic sheet supplying apparatus of FIG. 6.

FIGS. 1 and 2 show an automatic sheet supplying apparatus according to the present invention incorporated into a facsimile. Incidentally, the same parts as those in the aforementioned conventional apparatus (FIGS. 6 and 7) are designated by the same reference numerals and the explanation thereof will be omitted.

A rotational force from a motor 43 is continuously transmitted to a sheet supply roller 15 of the automatic sheet supplying apparatus, via a gear 46 attached to a motor shaft 45, idle gears 47, 49 and gear 26 attached to a roller shaft 25.

Further, the rotational force transmitted to the sheet supply roller 15 is discontinuously (intermittently) transmitted to a separation roller 11 of the automatic sheet supplying apparatus, via the gear 26 attached to the roller shaft 25, intermediate gear 29, intermittent gear 42 integrally formed with the intermediate gear 29, and gear 30 attached to a roller shaft 27. Accordingly, when the motor 43 is rotated, the sheet supply roller 15 (and an ejector roller 20) is rotated continuously. Whereas, when a toothed portion of the intermittent gear 42 is engaged by the gear 30, the separation roller 11 is rotated, and, when the toothed portion is disengaged from the gear 30, the separation roller 11 is stopped.

The separation roller 11 and the sheet supply roller 15 rotated as mentioned above are so designed that a peripheral speed of the former becomes the same as that of the latter to feed an original sheet 2 at a constant speed. Accordingly, even when the original sheet is fed by both rollers 11, 15 simultaneously, there is no slip between the original sheet and the rollers.

In the automatic sheet supplying apparatus having the above-mentioned arrangement, when the original sheets 2 stacked on an original support 1 are separated one by one by means of the separation roller 11 and the separated original sheet 2 is conveyed by the separation roller 11 up to a position ahead of a nip 37 between the sheet supply roller 15 and a driven roller 16, since the separation roller 11 is rotated discontinuously, the original sheet 2 is also conveyed discontinuously (intermittently). That is to say, while the toothed portion of the intermittent gear 42 is being engaged by the gear 30, the original sheet 2 is shifted, whereas, when the toothed portion is disengaged from the gear 30, the original sheet is stopped.

For example, when an outer diameter of the separation roller 11 is D, the number of teeth of the gear is Z30, the number of actual teeth of the intermittent gear 42 is ZX and the number of phantom teeth corresponding to a non-toothed portion of the intermittent gear 42 is ZY, if it is assumed that there is no slip between the separation roller 11 and the original sheet 2, a distance L that the original sheet is shifted by one tooth of the intermittent gear 42 will be $(L=)\pi D/Z30$.

Accordingly, the separation roller 11 repeats an operation for feeding the original sheet 2 by a distance $\pi D(ZX)/Z30$ and a stoppage for a distance $\pi D(ZY)/Z30$.

Further, when a leading end of the original sheet 2 enters into the nip 37 between the sheet supply roller 15 and the driven roller 16 due to the further operation of the separation roller 11, the original sheet 2 is conveyed by both the sheet supply roller 15 and the separation roller 11. In this case, since the sheet supply roller 15 is rotated continuously and the separation roller 11 is rotated intermittently, the original sheet 2 is conveyed by both the sheet supply roller 15 and the separation roller 11 which are rotated at the same peripheral speeds if the separation roller 11 is in the rotatable condition (i.e., if the toothed portion of the intermittent gear 42 is engaged by the gear 30). On the other hand, if the separation roller 11 is in the non-rotatable condition (i.e., if the toothed portion of the intermittent gear 42 is disengaged from the gear 30), the original sheets 2 is conveyed only by the sheet supply roller 15. In this case, since the original sheet 2 is pulled by the sheet supply roller 15, the separation roller 11 continues to be rotated at the same peripheral speed as that of the sheet supply roller 15 by an original sheet conveying force. Thus, when the rotational force is not transmitted to the separation roller 11, the latter is rotated as if continuously.

With the aforementioned operation, even when the original sheet 2 is conveyed by both the sheet supply roller 15 and the separation roller 11, the image information recorded by the pencil and the like on the original sheet 2 is not deteriorated by the relative slip movement between the original sheet and the separation roller 11.

Further, when the trailing end of the original sheet 2 has passed through a nip 36 between the separation roller 11 and the friction plate 12 due to the further rotation of the sheet supply roller 15, the original sheet 2 is conveyed only by the sheet supply roller 15. At the same time, a next original sheet 2 rested on the original support 1 is conveyed by the separation roller 11 with following the previous original sheet at the same speed. Now, since the previous original sheet 2 is conveyed by the sheet supply roller 15 which is rotated continuously, it is fed continuously, whereas, since the next original sheet 2 is conveyed by the separation roller 11 which is rotated intermittently, it is fed intermittently (discontinuously).

At the time when the next original sheet 2 starts to be fed by the separation roller 11, it is shifted with being continuous to the previous original sheet (i.e., in a condition that there is no gap (clearance) between the leading end of the next original sheet and the trailing end of the previous original sheet). This condition continues until the toothed portion of the intermittent gear 42 is disengaged from the gear 30 to stop the separation roller 11 temporarily. When the separation roller 11 is stopped (non-rotatable condition), the next original sheet 2 is also stopped temporarily. When the toothed portion of the intermittent gear 42 is engaged by the gear 30 again, the next original sheet 2 is conveyed again by the separation roller 11. Meanwhile, the previous original sheet 2 is being fed continuously by the sheet supply roller 15. Accordingly, in this case, a distance between the trailing end of the previous original sheet 2 and the leading nd of the next original sheet 2 becomes $\pi D(ZY)/Z30$, thus surely creating the gap between the trailing end of the previous original sheet 2 and the leading end of the next original sheet 2. As a result, an original end detection sensor 39 can surely detect the gap between the trailing end of the previous original sheet 2 and the leading end of the next original sheet 2.

When the leading end of the previous original sheet 2 enters into a nip 40 between the ejector roller 20 and a driven roller 21, the previous original sheet 2 is conveyed by both the ejector roller 20 and the sheet supply roller 15 which are rotated at the same peripheral speed. When the trailing end of the previous original sheet 2 has passed through the nip 37 between the sheet supply roller 15 and the driven roller 16, the previous original sheet 2 is conveyed only by the ejector roller 20. Meanwhile, the above-mentioned distance ($\pi D(ZY)/Z30$) is maintained. On the other hand, the next original sheet 2 is fed in the same manner as the previous original sheet 2.

In order to maintain the gap or distance ($\pi D(ZY)/Z30$) between the trailing end of the previous original sheet 2 and the leading end of the next original sheet 2 without fail, while the leading end of the next original sheet 2 is shifted from the nip 36 between the separation roller 11 and the friction plate 12 to the nip 37 between the sheet supply roller 15 and the driven roller 16, the toothed portion of the intermittent gear 42 must be disengaged from the gear 30 at least once to stop the separation roller 11 temporarily. Accordingly, when a length of a feeding path extending between the nip 36 between the separation roller 11 and the friction plate 12 and the nip 37 between the sheet supply roller 15 and the driven roller 16 is $L_1$, a relation $L_1 > \pi D(ZX)/Z30$ may be satisfied.

Further, the distance between the trailing end of the previous original sheet 2 and the leading end of the next original sheet 2 must have a certain minimum value to be surely detected by the original end detection sensor 39. When this minimum value is $L_2$, a relation $L_2 \leq \pi D(ZY)/Z30$ may be satisfied.

For example, when an outer diameter of the sheet supply roller 15 is 12 mm, an outer diameter of the separation roller 11 is 20 mm, $L_1$ is 20 mm, $L_2$ is 6 mm, the number of teeth of the gear 30 is 40, module of the gear 30 is 0.5, the number of teeth of the gear 26 is 24 and module of the gear 26 is 0.5, the above requirements are satisfied by using the intermittent gear 42 having the number of teeth of 16 (with toothed portion having the number of teeth of 10) and module of 0.5.

In the automatic sheet supplying apparatus according to the above-mentioned embodiment, the rotational force is intermittently transmitted to the separation roller 11, and this is realized by using the intermittent gear 42 meshed with the gear 30. The intermittent gear 42 does not arise the problems caused by the one-way clutch in view of cost, application and control, and is useful practically. Further, in case where the intermittent gear 42 is used, when the distance $L_2$ is controlled, the numbers of teeth of the gears 26, 30 do not need to be varied or changed, and, thus, it is possible to control the distance $L_2$ only by changing the numbers of teeth of the intermittent gear 42 and the intermediate gear 29 (these gears being formed integrally with each other). Thus, even when the outer diameters of the separation roller 11 and of the sheet supply roller 15 have already been determined, the design of the apparatus can easily be attained.

Figure 3:
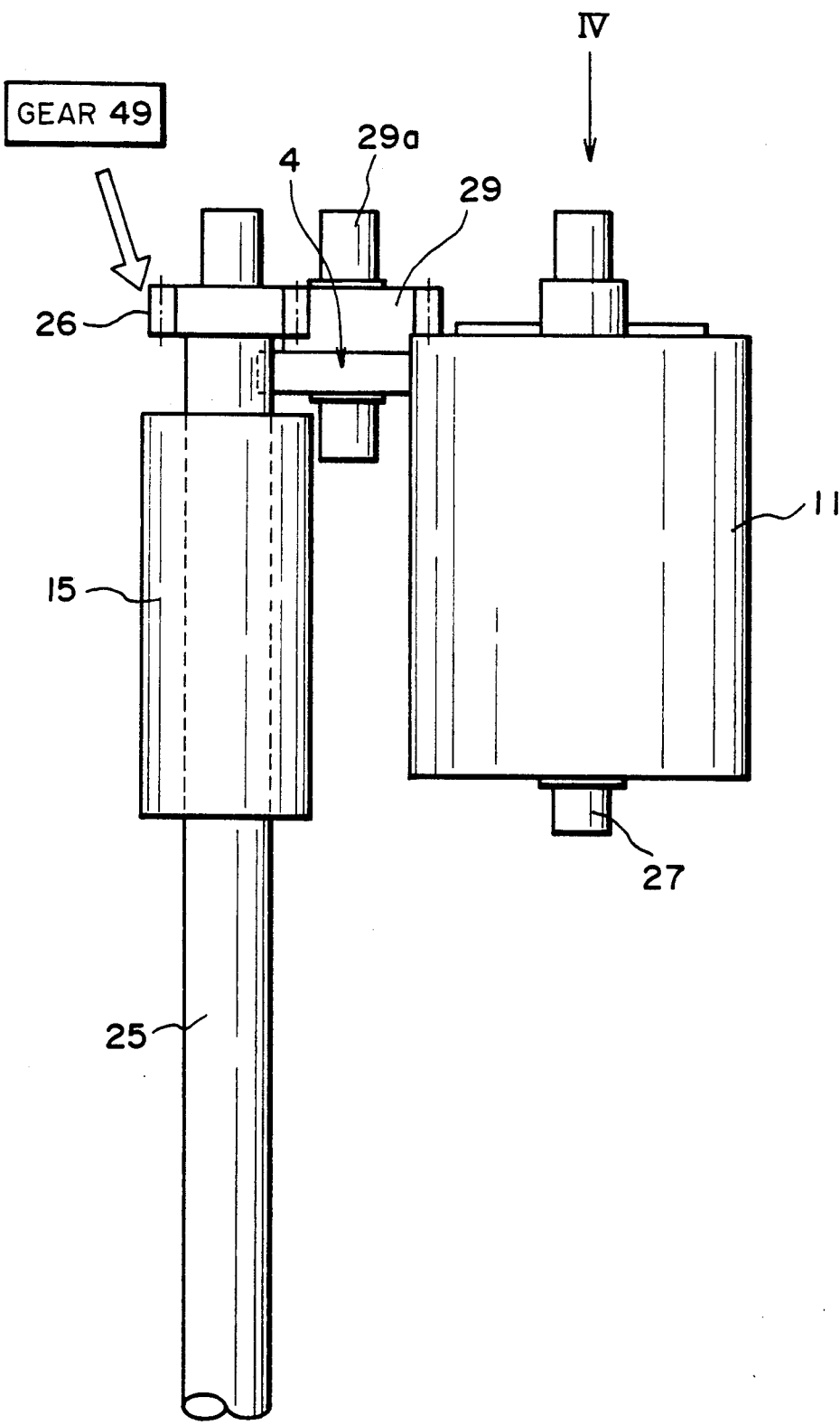
FIG. 3 is a plan view of an intermittent cam mechanism which is another embodiment for intermittently rotating a separation roller of the automatic sheet supplying apparatus.

Next, another embodiment for rotating the separation roller 11 intermittently or discontinuously will be explained with reference to FIGS. 3 to 5.

The gear 26 is fixedly mounted on one end of the roller shaft 25 of the sheet supply roller 15, and a rotational force is transmitted from a gear 49 connected to the motor 43 (FIG. 1) to the gear 26. The gear 26 is meshed with the intermediate gear 29 integrally formed with a support shaft 29a to which an intermittent cam 4 is fixed. The intermittent cam 4 is made of an elastic member such as hard rubber and is provided at its peripheral surface with recesses 4a and protruded portions 4b. Incidentally, the recesses 4a and the protruded portions 4b may comprise a pair of recesses 4a1, 4a2 diametrically opposed to each other and a pair of protruded portions 4ba, 4b2 diametrically opposed to each other, respectively, as shown in FIG. 4.

Figure 4:
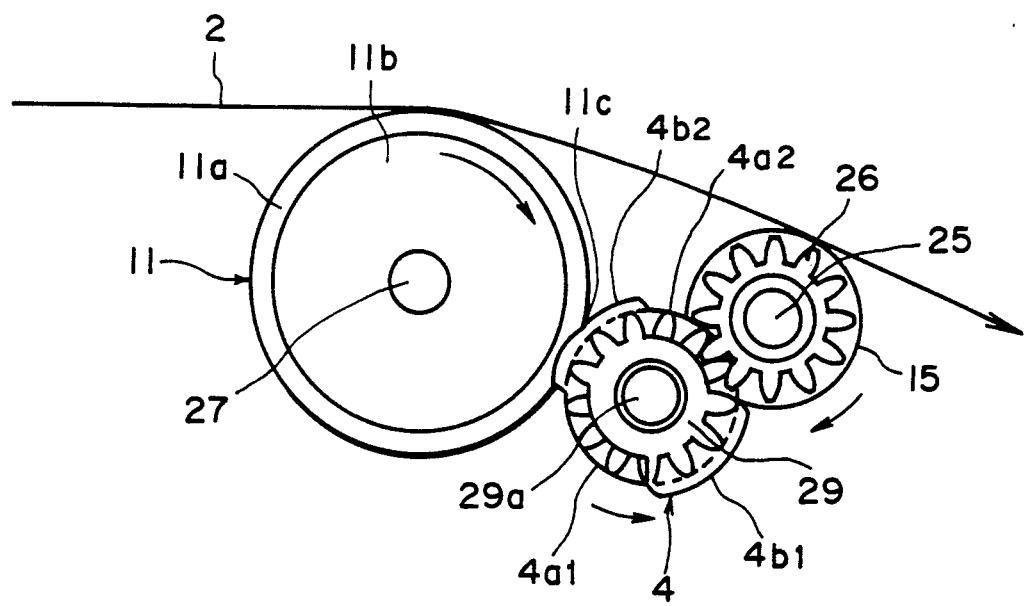
FIG. 4 is a side view looked at along the arrow IV in FIG. 3.
Figure 5:
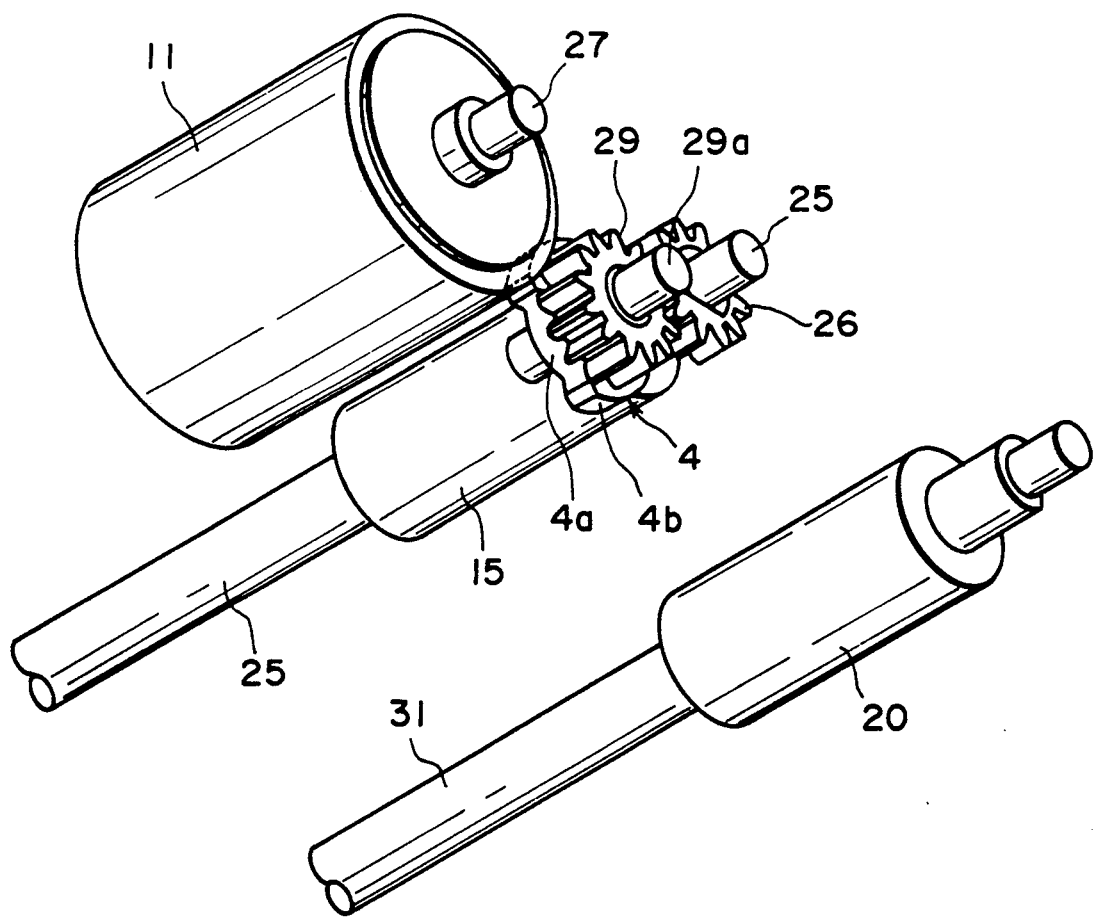
FIG. 5 is a perspective view of the intermittent cam mechanism looked at from the bottom.

As shown in FIG. 4, the separation roller 11 comprises a metal core 11b and a soft layer 11a made of soft rubber and covering the metal core. The protruded portion 4b1 (4b2) of the intermittent cam 4 can interfare with the soft layer 11a of the separation roller 11 so that the protruded portion penetrates into the soft layer 11a to provide a penetrated portion 11c as shown.

The sheet supply roller 15 is continuously rotated by the rotational force of the motor 43 in a direction shown by the arrow in FIG. 4 through the gear 49. Further, the rotational force of the motor 43 is transmitted to the intermittent cam 4 via the intermediate gear 29 meshed with the gear 26, thereby rotating the intermittent cam 4 in a direction shown by the arrow. When the protruded portion 4b1 (or 4b2) of the intermittent cam 4 penetrates into the soft layer 11a of the separation roller 11 as shown in FIG. 4, the rotational force of the intermittent cam is transmitted to the separation roller 11 to rotate the latter in the direction shown by the arrow. On the other hand, when the recess 4a1 (or 4a2) is opposed to the separation roller 11, the latter is in the non-rotatable condition.

Accordingly, the separation roller 11 is discontinuously rotated in the direction shown by the arrow by means of the protruded portion 4b1 or 4b2 of the intermittent cam 4 to feed the separated original sheet 2 toward the sheet supply roller 15 (positioned at a downstream side of the separation roller) intermittently. When the original sheet 2 enters into the nip 37 between the sheet supply roller 15 and the driven roller 16, it is fed by both the sheet supply roller 15 and the separation roller 11. To the contrary, when the recess 4a1 or 4a2 of the intermittent cam 4 opposes to the separation roller 11 to bring the latter to the non-rotatable condition, the original sheet 2 is fed only by the sheet supply roller 15, with the result that the separation roller 11 is rotatingly driven by the movement of the original sheet 2.

Also in this embodiment, since the peripheral speed of the separation roller 11 (being rotated) can be the same as that of the sheet supply roller 15, when the original sheet 2 is fed by both the sheet supply roller 15 and the separation roller 11, the image information recorded by the pencil and the like on the original sheet 2 is not deteriorated due to the relative slip between the original sheet and the separation roller 11. Since the previous original sheet 2 is fed continuously and the next original sheet 2 (immediately after separated) is fed discontinuously, the gap (clearance) is surely created between the trailing end of the previous original sheet 2 and the leading end of the next original sheet 2. Consequently, the trailing end of the previous original sheet 2 and the leading end of the next original sheet 2 can be surely detected by the original end detection sensor 39.

Further, in the method for creating the gap between the previous original sheet and the next original sheet by using the intermittent cam 4, when the distance $L_2$ between the original sheets is controlled, since circumferential lengths of the recesses 4a1, 4a2 of the intermittent cam 4 may merely be varied, the design of the apparatus can easily be attained.

Incidentally, while the peripheral speeds of the sheet supply roller 15 and of the separation roller 11 are normally selected to be the same, these speeds may be differentiated. For example, the peripheral speed of the separation roller 11 may be faster than that of the sheet supply roller 15. Further, the intermittent cam 4 can be made of other materials such as synthetic resin, than the hard rubber. In addition, peripheral surfaces of the protruded portions 4b1, 4b2 of the intermittent cam 4 may be knurled to improve the transmission ability of the rotational force to the separation roller 11.

What is claimed is:

1. An automatic sheet supplying apparatus for feeding preceding and succeeding sheets, comprising:
   a first supply rotary member for feeding a sheet intermittently;
   a second supply rotary member disposed downstream of said first supply rotary member in a sheet feeding direction and adapted to feed the sheet having a stop time period shorter than that of said first supply rotary member; and
   control means for controlling rotation of said first and second supply rotary members so that a succeeding sheet is fed to said first rotary member immediately after a trailing end of the preceding sheet passes from said first supply rotary member;
   said first supply rotary member being rotated intermittently so that it stops rotation and re-starts rotation before the leading edge of the sheet fed by rotation of said first supply rotary member reaches said second rotary member;
   whereby clearance is created between the preceding fed sheet and the succeeding sheet.

2. An automatic sheet supplying apparatus according to claim 1, wherein the stop time period of said second supply rotary member is zero, and further including a means for continuously rotating said second supply rotary member.

3. An automatic sheet supplying apparatus according to claim 1, further including a sheet stacking support on which the sheets are stacked, and wherein said first supply rotary member comprises a supply means for separating and feeding the sheets stacked on said sheet stacking support one by one.

4. An automatic sheet supplying apparatus according to claim 1, wherein said first supply rotary member has a drive gear, and a rotational force is transmitted to said first supply rotary member via an intermittent gear meshed with said drive gear.

5. An automatic sheet supplying apparatus according to claim 1, wherein said first supply rotary member has a friction member, and a rotational force is transmitted to said first supply rotary member via a friction rotary member intermittently abutting against said friction member.

6. An automatic sheet supplying apparatus according to claim 2, wherein said control means includes:
   a continuously rotating motor;
   first transmitting means for intermittently transmitting rotational force of said motor to said first supply rotary member; and second transmitting means for continuously transmitting the rotational force of said motor to said second supply rotary member.

7. An automatic sheet supplying apparatus according to claim 6, wherein said first and second transmitting means are so constructed that a peripheral speed of said first supply rotary member becomes same as that of said second supply rotary member and the said first supply rotary member is rotatingly driven by the movement of the sheet, when said sheet is fed by said second supply rotary member.

8. An automatic original supplying apparatus for feeding preceding and succeeding sheets, comprising:
an original support on which originals are stacked;
a feed rotary member for separating the originals on said original support one by one and feeding the separated original intermittently;
a convey rotary member disposed downstream of said feed rotary member in an original feeding direction and adapted to feed the original in a stop time period shorter than that of said feed rotary member;
reading mans disposed downstream of said convey rotary member in the original feeding direction and adapted to read the original; and
control means for controlling rotation of said feed rotary member and said convey rotary member so that the succeeding original is fed to said feed rotary member immediately after a trailing edge of the preceding original passes from said feed rotary member;
said feed rotary member being rotated intermittently so that it stops rotation and re-starts rotation before the leading edge of the original fed by rotation of said feed rotary member reaches said convey rotary member;
whereby the originals are read one by one by creating a clearance between the preceding original and the succeeding original.

9. An automatic original supplying apparatus according to claim 8, wherein the stop time period of said convey rotary member is zero, and further including a means for continuously rotating said convey rotary member.

10. An automatic original supplying apparatus according to claim 9, further comprising a sensor for detecting the original disposed between said convey rotary member and said reading means.

11. An automatic original supplying apparatus according to claim 9, wherein said feed rotary member has a separation roller for feeding a lowermost original on said original support and a friction member urged against said separation roller, and said convey rotary member has a lower convey roller and an upper driven roller urged against said convey roller; and
said control means includes a continuously rotating motor, a first transmitting means for intermittently transmitting a rotational force of said motor to said separation roller, and a second transmitting means for continuously transmitting the rotational force of said motor to said convey roller.

12. An automatic original supplying apparatus according to claim 11, wherein said first transmitting means comprises a gear train including an intermittent gear.

13. An automatic original supplying apparatus according to claim 11, wherein said first transmitting means includes a friction wheel for intermittently transmitting the rotational force to said separation roller.

14. An automatic original supplying apparatus according to claim 8, wherein a peripheral speed of said feed rotary member is same as that of said convey rotary member.

15. An automatic original supplying apparatus according to claim 12, wherein said feed rotary member is rotatingly driven by the movement of the original when said original is fed by said convey rotary member.

16. An automatic original supplying apparatus according to claim 13, wherein said feed rotary member is rotatingly driven by the movement of the original when said original is fed by said convey rotary member.

17. An automatic original supplying apparatus according to claim 14, wherein an additional convey rotary member is disposed at a downstream side of said reading means, and said convey rotary member and said additional convey rotary member are driven by a common drive source.

18. An automatic sheet supplying apparatus for feeding preceding and succeeding sheets, comprising:
a first supply rotary member for intermittently feeding a sheet;
a second supply rotary member disposed downstream of said first supply rotary member in a sheet feeding direction and adapted to feed the sheet in a stop time period shorter than that of said first supply rotary member; and
control means for controlling rotation of said first and second supply rotary members so that the succeeding sheet is fed to said first rotary member immediately after a trailing end of the preceding sheet passes from said first supply rotary member;
said first supply rotary member being driven intermittently so that it stops supply and starts re-supply before the leading edge of the sheet fed by rotation of said first supply rotary member reaches said second supply rotary member;
whereby a clearance is created between the preceding sheet and the succeeding sheet.

* * * * *

UNITED STATES PATENT AND TRADEMARK OFFICE
CERTIFICATE OF CORRECTION

PATENT NO. : 5,222,723
DATED : June 29, 1993
INVENTOR(S) : IJUIN

It is certified that error appears in the above-identified patent and that said Letters Patent is hereby corrected as shown below:

On the title page, Item [21] Appln, No., "753,839" should read -- 733,839 --.

<u>COLUMN 1</u>
    Line 12, "reader" should read --reader and--.

<u>COLUMN 4</u>
    Line 60, "synchronous" should read --synchronism--.

<u>COLUMN 7</u>
    Line 18, "sheets" should read --sheet--.
    Line 65, "nd" should read --end--.

<u>COLUMN 9</u>
    Line 13, "portions 4 ba," should read --portions 4 b1,--.

<u>COLUMN 10</u>
    Line 26, "sheet" should read --sheet,--.

<u>COLUMN 11</u>
    Line 24, "mans" should read --means--.

Signed and Sealed this

Fifteenth Day of March, 1994

Attest:

BRUCE LEHMAN

*Attesting Officer*     *Commissioner of Patents and Trademarks*